United States Patent [19]
Carpenter et al.

[11] Patent Number: 5,529,123
[45] Date of Patent: Jun. 25, 1996

[54] METHOD FOR CONTROLLING FLUID LOSS FROM WELLS INTO HIGH CONDUCTIVITY EARTH FORMATIONS

[75] Inventors: Robert B. Carpenter, Allen; Bonsall S. Wilton, Plano, both of Tex.

[73] Assignee: Atlantic Richfield Company, Los Angeles, Calif.

[21] Appl. No.: 419,450

[22] Filed: Apr. 10, 1995

[51] Int. Cl.⁶ .................. E21B 33/138; E21B 21/08; E21B 21/14
[52] U.S. Cl. .................. 166/293; 166/50; 166/300; 166/309; 175/48; 175/72
[58] Field of Search .................. 166/292, 293, 166/300, 309, 50; 175/40, 48, 72; 106/682

[56] References Cited

U.S. PATENT DOCUMENTS

| | | | |
|---|---|---|---|
| 2,607,428 | 8/1952 | Bond et al. | 166/293 X |
| 3,368,623 | 2/1968 | Carter et al. | 166/293 X |
| 4,304,298 | 12/1981 | Sutton | 166/293 |
| 4,466,833 | 8/1984 | Spangle | 166/293 X |
| 5,133,409 | 7/1992 | Bour et al. | 166/293 |
| 5,213,161 | 5/1993 | King et al. | 166/293 |
| 5,220,960 | 6/1993 | Totten et al. | 166/293 |
| 5,339,902 | 8/1994 | Harris et al. | 166/293 |
| 5,358,047 | 10/1994 | Himes et al. | 166/309 X |

Primary Examiner—George A. Suchfield
Attorney, Agent, or Firm—Michael E. Martin

[57] ABSTRACT

A method of reducing fluid loss into a highly conductive formation interval during drilling and completion of a well through such an interval wherein a foamed cement slurry, including an acid or oil soluble component, is injected into the well and forced into the conductive portions of the formation zone, which may comprise a fractured or rubblized formation portion. The cement is allowed to harden or set at a porosity of at least 15%, followed by resuming drilling and, in completing the well, dissolving the soluble component to increase the permeability of or disintegrate the cement to permit production of formation fluids into the well.

12 Claims, 1 Drawing Sheet

U.S. Patent  Jun. 25, 1996  5,529,123
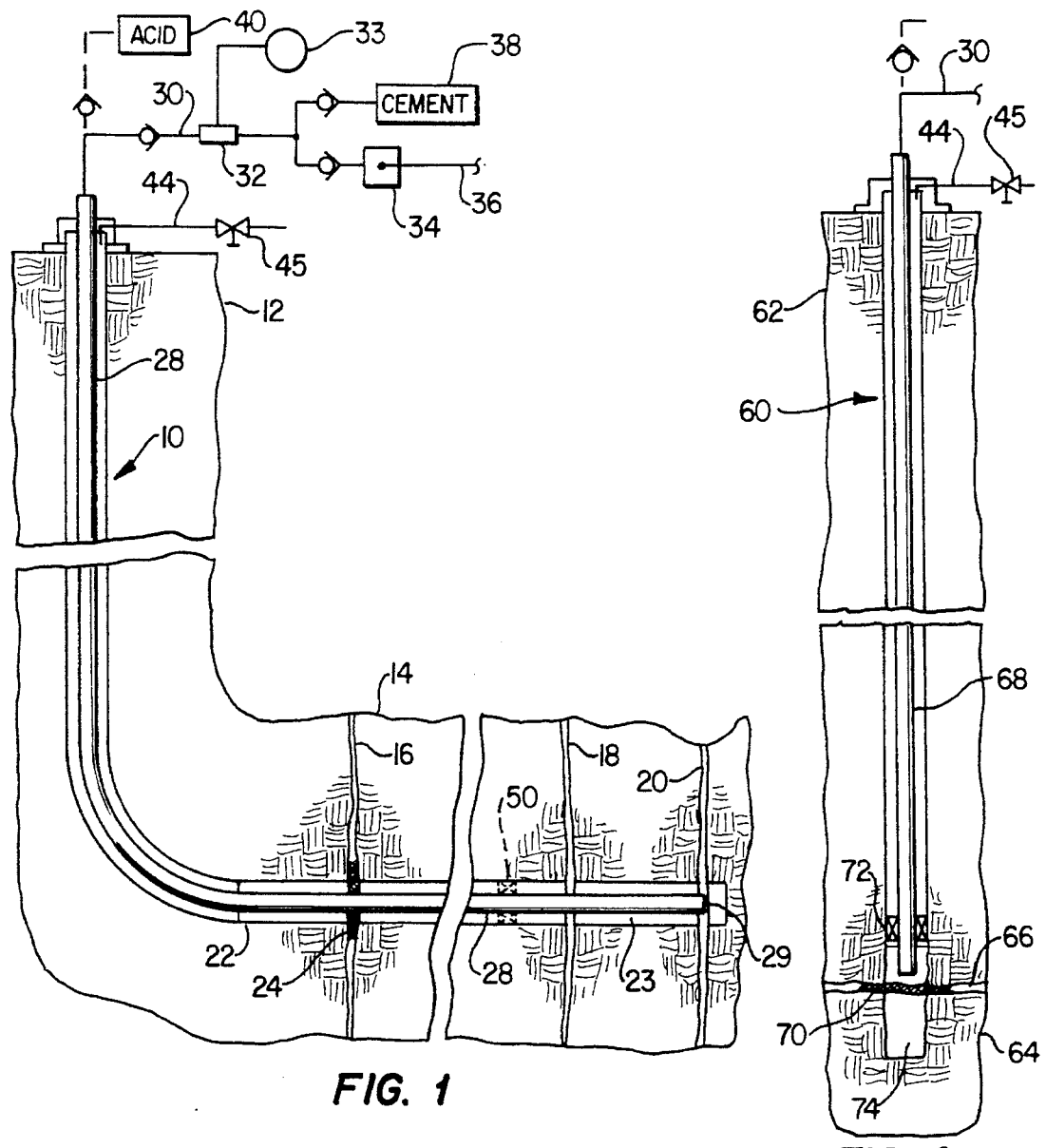
FIG. 1
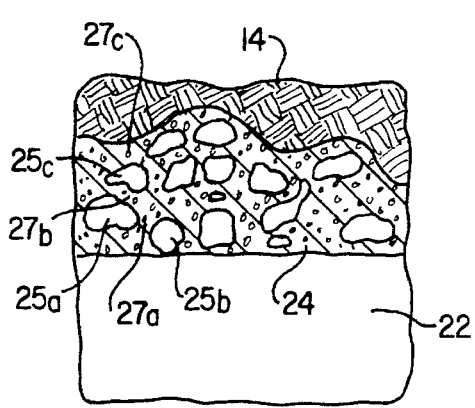
FIG. 2
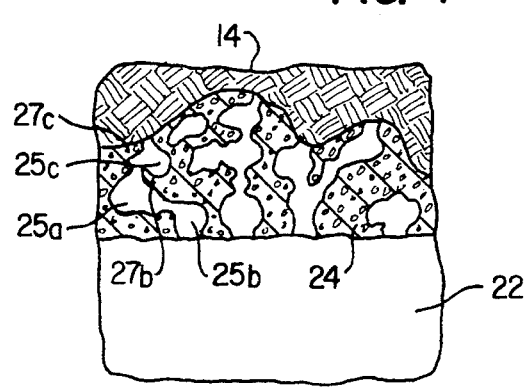
FIG. 3
FIG. 4

METHOD FOR CONTROLLING FLUID LOSS FROM WELLS INTO HIGH CONDUCTIVITY EARTH FORMATIONS

FIELD OF THE INVENTION

The present invention pertains to a method for controlling drilling and completion fluid losses from wells into fractured or rubblized earth formation intervals.

BACKGROUND

In the drilling and completion of wells for producing hydrocarbon fluids, for example, the wellbore is often required to be extended through one or more earth formation zones or intervals which are highly fractured, rubblized or otherwise highly conductive of fluids. In recent years efforts to develop hydrocarbon reserves have resulted in drilling highly deviated or so-called horizontal wellbores wherein a portion of the wellbore from which fluids are to be produced extends through a formation zone that may have several spaced-apart, generally vertically extending fractures. These fractured areas are typically oil bearing and are desired to be produced once the well is completed.

However, in the drilling process, as the wellbore penetrates each fracture or a highly fractured or rubblized area, substantial quantities of drilling fluid may be lost to the formation. It is not unusual for drilling fluid losses to exceed 5,000 to 10,000 barrels per well, representing substantial costs to the drilling operation. The addition of casing strings and conventional cementing operations to such wells only results in substantial additional costs. Moreover, carrying out conventional cementing operations or the injection of conventional fluid loss control materials may cause substantial loss of conductivity of the formation interval to which the drilling fluid has been lost. However, quite often this interval is also the one from which production of formation fluids is desired once the well is completed. Accordingly, there has been a continuing need to develop a method and means for preventing fluid loss to highly conductive earth formation zones during the drilling and completion of wells therein, including, in particular, deviated and generally horizontally extending wells which may penetrate multiple fractures in a fluid producing zone.

It has been suggested to provide improved support for well casings in unconsolidated formations and/or non-vertical well bores and to prevent the migration of particulate materials into well casings from unconsolidated formations and/or from non-vertical wellbores and to prevent wellbore collapse in unconsolidated formations and/or non-vertical wellbores by cementing a casing or liner in the wellbore using a foamed permeable cement composition injected into the wellbore annulus between the casing and the wellbore wall. U.S. Pat. No. 5,339,902 to Harris et al., assigned to Halliburton Company, Duncan, Okla. and to the assignee of the present invention, describes a method of cementing a well casing or liner in a wellbore by placing a foamed cement slurry composition in the wellbore annulus. The cement is allowed to harden and then drilling is carried out further through the hardened cement composition which remains in a cased or uncased portion of the wellbore adjacent to the annular area in which the cement composition has been placed to stabilize the wellbore and to secure the casing in place in the wellbore. The foamed cement composition is provided by dry mixing a cementitious material with any dry additives which are to be included in the composition, mixing the resulting dry blend of materials with water and any liquid additive to form a slurry, then pumping the slurry into the wellbore and injecting gas into the cement composition as it flows into the well.

The Harris et al. patent suggests pumping the foamed cement slurry through a tubing string disposed within a slotted or perforated well casing and wherein spaced apart fluid flow blocking devices, such as packers, are positioned on opposite sides of the slotted or perforated casing portion. The Harris et al. patent also suggests that the foamed cement composition may be pumped into an uncased portion of the well, allowed to harden and then drilling continued through the hardened cement material along at least a portion of the uncased well. The resulting permeable cement structure allows the free flow of oil and gas or other formation fluids into the well but prevents the substantial migration of formation particulates into the well. Still further, the above-mentioned patent suggests that the cement permeability may be enhanced by treating with hydrochloric and/or hydrofluoric acid or other matrix material treatments to increase the cement pore size and permeability.

More important, perhaps, than the elimination of wellbore collapse or production of fines from unconsolidated formations, is the first mentioned problem of eliminating substantial fluid loss during drilling operations and the resulting damage to fluid producing fractures, rubblized formation intervals and other highly conductive formations. Whereas the production of fines from an unconsolidated formation or the collapse of a wellbore can be remedied, the unwanted plugging of a producing formation interval, such as formation intervals provided by spaced apart vertical fractures, can result in permanent damage and loss of fluid production from the interval. It is to these ends that the present invention has been developed.

SUMMARY OF THE INVENTION

The present invention provides a method for minimizing the loss of drilling or completion fluids during the drilling or completion of a well in a highly conductive formation interval, or intervals, by the injection of a cementitious slurry into the formation interval which will harden or set to provide a barrier to loss of wellbore fluids into the formation and which is capable of being treated to reestablish conductivity of fluids from the formation into the wellbore. The cementitious slurry, which has a predetermined porosity in a hardened or set condition, is preferably foamed with a compressed gas or other porosity producing agent and is operable to temporarily plug the formation interval so that drilling and/or completion operations may be continued but wherein the formation interval or intervals which have been plugged may eventually be caused to produce formation fluids into the well.

The method of the present invention contemplates the placement of a cement composition in a highly conductive formation interval which will temporarily, substantially reduce the loss of wellbore fluids to the interval but which will provide for reestablishing formation conductivity when it is desired to produce formation fluids into the wellbore. The cement composition preferably has a porosity of greater than 15% in a hardened state and is capable of being treated to regain permeability of the formation interval so that fluids may be produced therefrom into a producing wellbore. In fact, the cement composition is preferably disintegrated once formation permeability is purposely reestablished.

The method of the invention is preferably carried out by injecting a cementitious slurry foamed with a compressed gas and a foam stabilizing surfactant to produce a slurry density in the range of about 4.0 to 13.0 pounds per gallon at wellbore temperature and pressure conditions so as to be capable of plugging conductive formation intervals including vertical fractures, rubblized zones, vugs and washouts.

In accordance with an important aspect of the invention, a method for minimizing the loss of drilling and/or completion fluids to fractured or rubblized formation zones is carried out by injecting a cement slurry, preferably including a cementitious material such as conventional API and ASTM classes of Portland cement, microfine Portland cement, calcium sulfate, and other acid soluble cement materials. Microfine Portland cement, having a Blaine fineness of about 9,000, for example, is particularly advantageous as the cementitious material and provides greater surface area desired for acid solubility to reestablish formation conductivity upon treatment. The cement material may also include an oil soluble material such as Gilsonite or certain polymeric materials. The cement composition also preferably includes suitable cement dispersants, retarders, extenders and accelerators and densifying agents such as hematite and manganese tetroxide. Both of these materials are preferably used to provide greater permeability, upon treatment, for relatively high density compositions.

In accordance with a further aspect of the present invention, a method for preventing fluid loss, during drilling into formation zones from which production fluids are to be eventually produced into the well, is carried out by interrupting the drilling procedure when unwanted drilling fluid loss is detected, and injecting a foamed cement material in accordance with the invention through the drill string, or a replacement tubing string, into the wellbore and causing such material to flow into the conductive formation zone and harden. Drilling may then be resumed and, upon completion of the drilling process, the hardened cement is treated to increase its permeability so that formation conductivity is reestablished and formation fluids may flow from the formation zone into the well. The permeability increasing treatment may be carried out by injecting a solution of acid or other solubilizing fluid, into the wellbore and in contact with the formation zone which has been temporarily cemented to increase the permeability of the cement to the extent that formation fluids may be allowed to flow into the wellbore with minimal impedance.

The method of minimizing fluid losses during drilling and yet providing for production from highly conductive earth formation zones in accordance with the invention possesses several advantages in drilling, completing, and producing fluids from wells which are drilled generally vertically or, in particular, in deviated or substantially horizontal directions, the latter being such as to provide for intersecting a major portion of a producing interval. Foamed cement compositions used in the method of the present invention have a high compressive strength to density ratio and allow continued drilling of the zone of interest after placement therein. Cement compositions may be provided which have advantageous thixotropic properties which minimize the invasion of formation fluid flow channels or fractures and thus minimize damage to producing intervals. Treatment of the cemented portions of the well after cessation of drilling operations, using the foamed cement compositions in accordance with the invention, provides for quicker penetration of permeability increasing acids thus providing for minimal impedance to flow of formation fluids once the cement plug has been treated and its permeability increased.

The method may be carried out using commonly available cement materials and equipment used in conventional drilling and cementing operations for wells. Moreover, the method is also applicable to carbonate and fractured sandstone type fluid production reservoirs, fractured shale reservoirs and vugular formations. The method may be carried out in open hole well completions, vertical, deviated or generally horizontal wells, wells being drilled with coiled tubing or wells being worked over. Moreover, the solubility and rate of dissolution of the cement plug may be modified by adjustment of the composition ingredients and density.

Those skilled in the art will recognize the above-mentioned advantages and features of the invention together with other superior aspects thereof upon reading the detailed description which follows in conjunction with the drawing.

BRIEF DESCRIPTION OF THE DRAWING

FIG. 1 is a schematic diagram of a well having a substantial horizontal wellbore portion being treated in accordance with the method of the present invention;

FIG. 2 is a detail view showing a cement composition in accordance with the invention in a set condition to reduce fluid loss from a wellbore to a highly conductive earth formation interval;

FIG. 3 is a view of the area shown in FIG. 2 showing the cement composition after treatment to increase its permeability; and FIG. 4 is a schematic diagram of a substantially vertical well being treated in accordance with the method of the present invention.

DESCRIPTION OF PREFERRED EMBODIMENTS

In the description which follows like elements are marked throughout the specification and drawing with the same reference numerals, respectively. The drawing figures are in schematic form in the interest of clarity and conciseness.

The method in accordance with the invention for minimizing fluid loss into a highly conductive formation preferably utilizes a foamed cement composition which, when set and treated in accordance with the invention, is sufficiently permeable to allow oil, gas and other formation fluids to flow through the cement composition and into a well but will not allow a substantial flow of fluid in the opposite direction while drilling and completion activities are being carried out. A cement composition in accordance with the invention having a porosity, upon hardening, greater than 15%, is believed to be sufficient to permit treatment to establish permeability and sufficient to reinstate suitable formation conductivity, preferably substantially equal to the original level of conductivity. It is desirable, in fact, to dissolve or disintegrate as much of the composition as possible, once it has served its purpose, in order to minimize loss of formation conductivity. Porosity is defined as the volume of void space as a percent of total volume of a unit of the cement composition. The cement composition in accordance with the invention may have a permeability after a solubilizing treatment of greater than 300 millidarcies.

A foamed cement composition used in the method of the invention may comprise a hydraulic cement with an amount of water sufficient to form a pumpable slurry and a foaming agent such as compressed nitrogen, air or natural gas, for example. Examples of hydraulic cements which are preferred for use in the method of the invention include, in particular, API and ASTM classes of conventional and microfine Portland cements, magnesium/calcium oxide cement, calcium sulfate, and, in certain instances, oil soluble materials such as Gilsonite. An example of a suitable magnesium/calcium oxide cement is sold under the trade name "MAGNA-PLUS" by BJ Services, Houston, Tex. An example of microfine Portland cement has 90% of its particles less than ten microns maximum particle size.

The gas component of the foamed cement is preferably added to a hydraulic cement composition using one of the above-mentioned cementitious materials in an amount sufficient to provide a foamed cement composition having a density in the range of from about 4.5 ppg (pounds per gallon) to about 14.0 ppg. A slurry using microfine Portland cement having a density of about 13.0 ppg and then foamed to a density of about 4.0 ppg may be suitable for many applications.

Compressed nitrogen, air or natural gas may be used as the gas foaming component. Compressed air provides a slightly larger bubble structure than nitrogen and thus a foamed cement composition using compressed air may eventually be treated to be more permeable than one using nitrogen. Natural gas is readily available in many treatment operations at pressures suitable for foaming the slurry. It is indicated that at least a final permeability of from about 0.3 darcies to about 30.0 darcies may be obtained after acid treatment when the foaming agent (gas) is present in an amount of from about thirty percent to about seventy percent by volume based on the total volume of the foamed cement composition. The cement composition may, preferably, be disintegrated by the acid treatment and the flow of fluids into the well from the treated interval.

The cement composition should include a chemical foaming agent to aid in the foam forming process and to stabilize the composition. Commercially available foaming agents such as amoniumethersulfate, ethyleneglycolmonobutal ether and water are suitable. The chemical foaming agent should be present in the cement composition in the range of about 0.5% to 5.0% by volume based on the total volume of the cement and the water components of the composition. A foam stabilizer such as 1-propanaminium, 3 -amino-N-(carboxymethyl)-N-N-dimethyl-N-Coco alkyl in the amount of about 0.25 percent to 3.0 percent by volume, is suitable, again based on the total volume of the hydraulic cement and the water components of the foamed cement composition.

Additives such as fluid loss additives, lost circulation additives, expansion additives, hardening accelerators, hardening retarders, weighing agents and strength enhancing fibers may be added to the cement composition.

The cement composition may be prepared using techniques common in the art for preparing oil-well cement compositions. The cement component of the composition together with any dry additives which are to be included may be mixed together and then with water and any liquid additive to form a slurry. The slurry is then pumped to a well wherein the compressed gas component of the composition is injected into the slurry at a suitable fitting so that the resulting foamed cement composition flows into the wellbore and down through a suitable tubing string in a stable condition. Certain liquid additives to be used could be injected into the cement composition as it flows to the wellbore.

Referring now to FIG. 1, there is illustrated a well 10 being drilled into an earth formation 12 having a zone 14 in which are disposed several spaced-apart generally vertically extending fractures 16, 18 and 20, for example. The formation zone 14 is identified as one which contains hydrocarbon fluids which are producible from the formation into the well 10. The well 10 has a substantial, generally horizontally extending wellbore portion 22 which is shown in an "open hole" condition. The wellbore portion 22 is preferably drilled as far as possible through the producing formation zone 14 so that formation fluids may eventually be produced through the well 10 to the surface. The well 10 is shown in a condition wherein drilling is not complete but a tubular drill string, not shown, has been removed after encountering the fractures 18 and 20. A fracture 16 has already been treated in accordance with the invention to provide a fluid loss blocking quantity of cement, indicated at 24 in FIG. 1. Alternatively, the aforementioned drill string may be left in the well and the below described cement placement method carried out by injecting the slurry through the drill string.

The fractures 18 and 20 are open to the wellbore portion 22 and continued drilling and circulation of drilling fluid through that wellbore portion would result in substantial loss of fluid and drilled solids into the fractures and possible damage to the formation zone 14. Accordingly, a tubing string or drill string 28 is shown inserted in the wellbore portion 22 and extending to the surface and in communication with a fluid flow line 30 having a suitable gas injection tee 32 interposed therein between the tubing string 28 and a fluid injection pump 34. The tee 32 is in communication with a suitable source 33 of pressure gas, nitrogen, natural gas or air, for example. The pump 34 may be in communication with a conventional drilling fluid recirculation system, not shown, by way of conduit 36. A suitable source 38 of foamable cement is shown operable to be in communication with the flowline or conduit 30 and a suitable source 40 of acid solution or other solubilizing fluid is also operable to be placed in communication with the tubing string 28. The sources 38 and 40 may each include suitable pumping equipment, not shown, for delivering the cement slurry and solubilizing solution to the wellbore space 23. Fluid occupying the annular space in the wellbore 22 between the tubing string 28 and the wellbore wall may be returned to the surface and conducted through a suitable return conduit 44 in a conventional manner.

A quantity of foamable cement is prepared in the form of a slurry, the density of which may be greater or less than or about the same as the drilling fluid occupying the well 10. In the case of cementing fractures in the horizontally extending well portion 22, the cement may be of lower density than the fluid occupying the well since there will be little tendency for the fluid to migrate away from the wellbore portion 22 as a result of density differences between the cement mixture and the wellbore fluid. Moreover, regardless of wellbore attitude, the cement slurry density is not critical in most instances wherein fluid flow (loss) is substantial out of the well and into the formation.

By way of example, a quantity of foamable cement may be mixed in a ratio of 20.5 gallons of fresh water to ninety-four pounds of South Dakota Class G cement and one hundred and eighty-eight pounds of calcium carbonate. Suitable quantities of the aforementioned foaming agents and foam stabilizers may be added in the percentages indicated. A slurry of the composition may be pumped through the conduit 30 and injected with compressed air, nitrogen or natural gas at the fitting 32 to suitably foam the cement mixture prior to conducting the mixture down through the tubing string 28 and out into the wellbore space 23 between the fractures 18 and 20. Suitable squeezing action may be obtained, if necessary, by throttling the flow of fluid through the return conduit 44 at a throttling valve or choke 45 and/or by placing an isolation tool 50 in the position shown in the wellbore portion 22. The distal end 29 of tubing string 28 may extend just beyond the tool 50, if such is used. If substantial fluid loss is occurring into the formation 14, throttling of fluid returns or use of tool 50 is not required. The cement composition may be spotted in the well 10 by pumping drilling fluid behind it. The tubing string 28 may then be withdrawn and drilling may then be resumed after the cement is set or hardened. If the cement slurry is pumped through a drill string the drill string may be moved uphole to prevent being cemented in place and then drilling may be resumed in a conventional manner.

Upon completion of drilling operations, a suitable acid solution, such as up to a thirty percent (by volume) solution of hydrochloric acid in water, or twenty-four percent hydrochloric acid and six percent hydrofluoric acid in water, may be injected into the wellbore portion 22, again using a tubing string or drill string, such as the tubing string 28, and caused to flow back to the surface through the annulus 23 to effect dissolving of acid soluble particulates, for example, the calcium carbonate or Portland cement in the composition occupying the fractures 16, 18 and 20, to increase composition permeability. Dolomite and/or ground marble may also be present in the cement composition as the acid soluble component.

It is indicated that dolomite and/or ground marble and/or calcium carbonate and microfine Portland cement materials present in the cement composition add substantial bridging properties to the foamed cement but provides low permeability until the cement is treated with an acid or other solubilizing solution to increase the cement porosity. In other words, the void spaces in the hardened or set condition of the cement are substantially enclosed by at least a thin web of cementitious material such that conductivity and permeability are limited or controlled. However, once exposed to a solubilizing fluid, the void spaces become connected due to dissolving of the cementitious webs and the presence of material such as calcium carbonate. Accordingly, fluid conductivity or permeability of the cement layer is increased significantly. FIGS. 2 and 3 illustrate this behavior. Preferably, the cement layer disintegrates and small particles or rubble is produced out of the well with production fluids.

Referring to FIG. 2, a small part of the wellbore portion 22 is shown wherein a foamed cement composition 24 in accordance with the invention has been placed and allowed to set to reduce fluid conductivity between the formation interval 14 and the wellbore 22. Several void spaces 25a, 25b, 25c and so on are present in the cement layer between the wellbore portion 22 and the formation interval 14. However, at least relatively thin webs 27a, 27b and 27c of cementitious material are present between the void spaces 25a and 25b, between the void spaces 25a and 25c, and between the void space 25c and the formation interval 14, respectively. Accordingly, even though the cement layer 24 is highly porous, its permeability between the wellbore portion 22 and the formation interval 14 is substantially nil or at least controlled.

FIG. 3 illustrates the same area of the wellbore portion 22 as shown in FIG. 2 after the cement layer has been treated with a solubilizing fluid such as an acid to dissolve one of the aforementioned soluble materials present in the cement composition. As shown in FIG. 3, at least portions of the webs 27a, 27b and 27c, which may include calcium carbonate or other acid soluble bridging materials, have been dissolved to interconnect the void spaces 25a, 25b and 25c so that a fluid conductive path exists between the wellbore portion 22 and the formation interval 14. Accordingly, the permeability of the cement layer 24 has been substantially increased to allow in situ as well as placed fluids to flow from the formation interval 14 into the wellbore portion 22.

In this way, the foamed cement may be placed in a fracture or vug or other highly conductive formation interval, allowed to harden or set without being substantially permeable to the flow of fluids in either direction between the formation interval and the wellbore, but be capable of further treatment to substantially increase permeability when desired. Although some permeability may exist in the cement composition after it has set, the level of permeability is sufficiently low to allow solids in the drilling fluid to further plug the cement material to prevent fluid loss during drilling and completion operations.

It is indicated that dolomite or ground marble may be substituted for calcium carbonate in the aforementioned composition with substantially equal results of increased permeability after treatment. Even though certain compositions in accordance with the method of the invention may have an initial permeability after placement and setting, the aforementioned plugging of the cement with drilling fluid solids and the like, requires the aforementioned acid treatment to regain maximum flow of formation fluids to the well.

It is further indicated that a cement composition of the type described herein may be formed using solids particulates of oil soluble material such as Gilsonite and other suitable oil soluble resins.

Referring now to FIG. 4, a similar fluid loss control method may be carried out on a substantially vertical well 60 penetrating an earth formation 62 into a formation interval 64 having a vug 66 which is desired to be plugged to prevent fluid loss. The well 60 may be treated in the same manner as the aforedescribed method for treating well 10. A tubing string 68 is shown disposed in the well 10, which may comprise a drill string, and is adapted to be connected to the conduit 30, the aforementioned pump 34 and the sources of cement slurry and acid solution shown in FIG. 1. A cement composition along the lines described above and having a density approximately equal to the requisite density of drilling fluid used in drilling the well 60 is made up and injected through the tubing string 68 to effect plugging of the fracture 66 to form a porous cement plug 70. Squeezing action may be carried out, if required, by placing a suitable isolation tool 72 in the position indicated in FIG. 4 or the cement may be squeezed by snubbing the return line 44. A suitable quantity of foamed cement is spotted by pumping fluids behind the cement through the tubing string 68 to fill the wellbore space 74 including the vug 66. The cement composition is allowed to harden and drilling is then resumed. Upon completion of drilling the well 60 the aforementioned acid solution is pumped into the wellbore space 74 to react with the cement plug 70 to dissolve the acid soluble components therein so that production fluids may flow into the wellbore when desired.

In making up the cement composition for injection into the well 60, the density may be adjusted such that it is greater than, less than or about equal to the density of the drilling fluid occupying the wellbore space. Moreover, it is important that the cement composition include at least one component which is acid or oil soluble. One preferred additive for the aforementioned cement composition for accomplishing such purposes would be calcium carbonate since this material is essentially an inert additive, when included in foamed cement, but is readily dissolvable in the hardened cement when treated with such acids. However, a density increasing or weighting agent, such as hematite, may be used in addition to the calcium carbonate.

Those skilled in the art will appreciate that improvements in minimizing or eliminating fluid loss from wellbores penetrating high conductivity formations may be carried out using the method described hereinabove and the exemplary cement compositions described, as well as similar compositions. It should be emphasized that the method contemplates placement of a formation plugging material which has a sufficient porosity, when set or hardened, to eventually provide for conductivity of formation fluids into the well comparable to original formation conductivity. However, the formation plugging composition must also be of reduced permeability, initially, to prevent fluid loss into the formation from the well. The initial permeability of the formation plugging cement composition may be such as to allow some fluid loss but particulates in drilling fluid and the like will filter out and build a layer of "filter cake" to prevent further fluid loss. Moreover, the porosity of the composition should be such that when the composition is treated with an acid or other solubilizing material, the composition either disintegrates and particles or rubble are produced out of the well, or at least the pore spaces in the material matrix will increase in size due to dissolving of the soluble materials, so that the original formation conductivity is substantially restored.

Although a preferred method for reducing or eliminating fluid loss in high conductivity earth formations from which fluid production is eventually desired has been described herein those skilled in the art will recognize that various substitutions and modifications may be made to the method without departing from the scope and spirit of the appended claims.

What is claimed is:

1. A method of reducing injected fluid loss during drilling and/or completion of a well in a high conductivity formation, comprising the steps of:

injecting a cement composition as a foamed slurry into said well and into a conductive portion of said formation, said cement composition having a porosity in a hardened or set state of at least 15% and including a dissolvable component which is soluble in a fluid such that, at a predetermined time, the permeability of said cement composition may be increased to permit flow of formation fluids into said well from said conductive portion of said formation, said dissolvable component being selected from a group consisting of dolomite, ground marble and microfine Portland cement;

allowing said cement composition to harden;

resuming circulation of fluids into said well without substantial loss to said conductive portion of said formation; and circulating an acid solution into said well consisting of at least one of hydrochloric acid, citric acid, formic acid, oxalic acid, sulfuric acid, phosphoric acid and hydrofluoric acid in water to dissolve said component of said cement composition to increase the permeability of said cement composition to minimize the impedance of said cement composition to the flow of fluids between said formation and said well.

2. The method set forth in claim 1 including the step of:

providing said slurry to have a density in the range of about 4.0 pounds per gallon to about 13.0 pounds per gallon.

3. The method set forth in claim 2 including the step of:

providing said cement composition with a cementitious material selected from a group consisting of Portland cement, magnesium/calcium oxide cement and calcium sulfate.

4. A method of substantially reducing fluid loss from a well being drilled into a highly conductive earth formation zone comprising the steps of:

monitoring the return of drilling fluid to the surface during drilling of said well through said zone to detect an unsatisfactory fluid loss rate into said zone;

placing a fluid conducting tubing string in said well;

injecting a foamed cement slurry into said well through said tubing string, said cement slurry comprising a hydraulic cement including water and a cementitious material selected from a group consisting of Portland cement, magnesium/calcium oxide cement and calcium sulfate, an acid soluble component including at least one of said cementitious material, calcium carbonate, dolomite, and ground marble, a foaming agent and compressed gas consisting of one of air, nitrogen and natural gas;

forcing said cement slurry into said zone;

allowing said cement slurry to set;

resuming drilling of said well;

injecting an acid solution into said well comprising up to about thirty percent by volume, in a solution of water, of at least one of hydrochloric acid, hydrofluoric acid, citric acid, formic acid, oxalic acid, sulfuric acid and phosphoric acid, to react with said acid soluble component to increase the permeability of said cement to the flow of formation fluids into said well; and placing said well in operation to allow fluids to flow through said cement between said formation zone and said well.

5. The method set forth in claim 4 including the step of:

providing said cement slurry to have a density greater than, less than or equal to the density of drilling fluid occupying said well prior to placement of said cement slurry in said well.

6. The method set forth in claim 4 including the step of:

providing said cement slurry with a porosity of greater than 15%.

7. The method set forth in claim 4 including the step of:

providing said acid soluble component as microfine Portland cement.

8. A method for reducing fluid loss into an earth formation interval having spaced apart fractures penetrated by a deviated or generally horizontal wellbore portion of a well to permit continued drilling of said well without substantial loss of drilling fluid, comprising the steps of:

detecting substantial loss of drilling fluids during drilling operations of said wellbore portion;

ceasing drilling said wellbore portion;

connecting a tubing string in said wellbore portion to a source of a slurried and foamed cement composition comprising a cementitious material, water, and a soluble component selected from a group consisting of Portland cement, magnesium/calcium oxide, calcium sulfate, calcium carbonate, dolomite, ground marble and Gilsonite and a foam generating gas selected from a group consisting of compressed air, nitrogen and natural gas, and injecting said cement composition into said wellbore portion through said tubing string to penetrate at least one fracture intersecting said wellbore portion;

allowing said cement composition to harden in said fracture;

resuming drilling of said well to completion of drilling of said wellbore portion;

allowing a solubilizing fluid selected from a group consisting of a hydrocarbon oil and a solution of water and one of hydrochloric acid, hydrofluoric acid, formic acid, citric acid, oxalic acid, phosphoric acid and sulfuric acid to effect dissolving said component to increase the permeability of said cement composition; and allowing formation fluids to flow into said wellbore portion through said cement composition.

9. The method set forth in claim 7 wherein:

said cement composition includes, after hardening, water in an amount of from about thirty percent to two hundred percent by weight of said cement composition and said gas is present in an amount of from about thirty percent to seventy percent by volume based on the total volume of said slurry.

10. The method set forth in claim 8 wherein:

said cement composition has a density in the range of about 4.0 pounds per gallon to 13.0 pounds per gallon.

11. The method set forth in claim 8 including the step of:

adding sufficient pressure gas to said cement composition to provide a porosity of greater than 15 percent.

12. The method set forth in claim 8 including the step of:

providing said soluble component as microfine Portland cement.

* * * * *